(12) United States Patent
Rajput et al.

(10) Patent No.: US 8,046,224 B2
(45) Date of Patent: Oct. 25, 2011

(54) SPEAKER ADAPTATION OF VOCABULARY FOR SPEECH RECOGNITION

(75) Inventors: Nitendra Rajput, New Delhi (IN); Ashish Verma, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 293 days.

(21) Appl. No.: 12/105,390

(22) Filed: Apr. 18, 2008

(65) Prior Publication Data
US 2008/0215326 A1 Sep. 4, 2008

Related U.S. Application Data

(63) Continuation of application No. 10/320,020, filed on Dec. 16, 2002, now Pat. No. 7,389,228.

(51) Int. Cl.
G10L 15/06 (2006.01)
G10L 15/04 (2006.01)
G10L 15/28 (2006.01)

(52) U.S. Cl. .................. 704/254; 704/243; 704/255
(58) Field of Classification Search .................. None
See application file for complete search history.

(56) References Cited

U.S. PATENT DOCUMENTS

| | | | |
|---|---|---|---|
| 6,073,096 A * | 6/2000 | Gao et al. ................ 704/245 |
| 6,078,885 A | 6/2000 | Beutnagel | |
| 6,125,341 A * | 9/2000 | Raud et al. ................ 704/8 |
| 6,212,498 B1 * | 4/2001 | Sherwood et al. ....... 704/244 |
| 6,366,882 B1 * | 4/2002 | Bijl et al. ................ 704/235 |
| 6,389,394 B1 * | 5/2002 | Fanty ................ 704/249 |
| 6,442,519 B1 | 8/2002 | Kanevsky et al. | |
| 6,665,644 B1 * | 12/2003 | Kanevsky et al. ....... 704/275 |
| 6,732,074 B1 * | 5/2004 | Kuroda ................ 704/244 |
| 6,941,264 B2 * | 9/2005 | Konopka et al. ....... 704/243 |
| 6,973,427 B2 * | 12/2005 | Hwang et al. ........... 704/249 |
| 6,985,861 B2 | 1/2006 | Van Thong et al. | |
| 7,120,582 B1 | 10/2006 | Young et al. | |
| 7,240,002 B2 | 7/2007 | Minamino et al. | |
| 7,389,228 B2 | 6/2008 | Rajput et al. | |
| 2002/0087317 A1 | 7/2002 | Lee et al. | |
| 2002/0095282 A1 | 7/2002 | Goronzy et al. | |
| 2002/0128820 A1 | 9/2002 | Goronzy et al. | |
| 2004/0073425 A1 | 4/2004 | Das et al. | |
| 2004/0107097 A1 * | 6/2004 | Lenane et al. ........... 704/231 |
| 2008/0147404 A1 * | 6/2008 | Liu et al. ................ 704/256.2 |

OTHER PUBLICATIONS

Lee, et al, "A Study on the Speaker Adaptation of the Parameters of Continuous Density Hidden Markov Models," IEEE Transaction on Signal Processing, col. 39, No. 4, Apr. 1991.

Sankar, et al., "Task-Specific Adaptation of Speech Recognition Models," Proceedings of Automatic Speech Recognition and Understanding, ASRU, 2001.

Lee, et al, "Symbolic Speaker Adaptation for Pronunciation Modeling," in ISCA Tutorial and Research Workshop on Pronunciation Modeling and Lexicon Adaptation for Spoken Language, Sep. 14-15, 2002.

T. Akutsu, "Approximate String Matching with don't Care Characters," Information Processing Letter 55, 235-239, 1995.

Kat, et al, "Fast accent Identification and accented Speech Recognition," IEEE Conference on Acoustics, Speech and Signal Processing, vol. 1, pp. 221-224, 1999.

\* cited by examiner

*Primary Examiner* — Matthew Sked
(74) *Attorney, Agent, or Firm* — Wolf, Greenfield & Sacks, P.C.

(57) ABSTRACT

A phonetic vocabulary for a speech recognition system is adapted to a particular speaker's pronunciation. A speaker can be attributed specific pronunciation styles, which can be identified from specific pronunciation examples. Consequently, a phonetic vocabulary can be reduced in size, which can improve recognition accuracy and recognition speed.

15 Claims, 4 Drawing Sheets

SPEAKER ADAPTATION OF VOCABULARY FOR SPEECH RECOGNITION

CROSS-REFERENCE TO RELATED APPLICATIONS

This application is a continuation of U.S. application Ser. No. 10/320,020 filed Dec. 16, 2002, the complete disclosure of which, in its entirety, is herein incorporated by reference.

FIELD OF THE INVENTION

The present invention relates to speaker adaptation of a vocabulary for speech recognition.

BACKGROUND

Speech recognition systems use a "phonetic vocabulary" that contains pronunciations of all the words that may be spoken by a speaker. Spoken words are matched against their recognized equivalent, and then provided to the speaker. Two performance criteria for speech recognition systems are speed and accuracy of recognition. Various refinements have been devised to improve these two performance criteria. The performance of a general purpose speech recognition system can be improved by adapting the system to a particular speaker. Many such refinements can be classified as either of two general types of adaptation mechanism.

The first kind of adaptation mechanism involves adapting acoustic models of speech used in the speech recognition system, and the second kind of adaptation mechanism involves adapting the vocabulary used by the speech recognition system.

Acoustic model adaptation (see Chin-Hui Lee, Chih-Heng Lin, Biing-Hwang Juang, "A Study on the speaker adaptation of the parameters of continuous density Hidden Markov Models," *IEEE Transaction on Signal Processing, Vol.* 39, No. 4, April 1991) is generally used to improve recognition accuracy for a particular speaker, or in a particular environment. Acoustic model adaptation may be used in, for example, noisy environments, telephony environments, and office environments.

Vocabulary adaptation, by contrast, may be used in the context of performing particular task speakers (see A. Sankar, A. Kannan, B. Shahshahani, E. Jackson, "Task-specific Adaptation of Speech Recognition Models," *Proceedings of Automatic Speech Recognition and Understanding, ASRU,* 2001). Particular vocabularies that are likely to be used are commonly context-dependent. A specific vocabulary is implied when the speaker is, for example, dictating technical correspondence, or performing certain command and control tasks.

There have been approaches wherein an adaptation of the vocabulary is achieved through changing the pronunciation networks (Kyung-Tak Lee, Lynette Melnar, Jim Talley, "Symbolic Speaker Adaptation for Pronunciation Modeling," in *ISCA Tutorial and Research Workshop on Pronunciation Modeling and Lexicon Adaptation for Spoken Language*, Estes Park, Colo. USA, Sep. 14-15, 2002). This uses a pronunciation network to "generate" all the pronunciations of the words. Such a technique cannot work on choosing from the existing pronunciations that could have been created manually earlier.

These three types of adaptation mechanisms are responsible for improvements in the three above-mentioned performance criteria. Further advances in these performance criteria are welcome, and thus a need clearly exists for improved speech recognition techniques.

SUMMARY

A phonetic vocabulary for a speech recognition system can be adapted to a particular speaker's pronunciation. A speaker can be attributed specific pronunciation styles, which can be identified from specific pronunciation examples. Consequently, a recognized phonetic vocabulary can be reduced in size, which can improve recognition accuracy and recognition speed.

DETAILED DESCRIPTION

A central difficulty involved in designing speech recognition systems is that different people pronounce words differently. Such alternative pronunciations must be taken into account by speech recognition systems. Alternate pronunciations of words are, in existing speech recognition systems, stored in a phonetic vocabulary to perform speech recognition. Table 1 below provides some examples in the English language. Table 2 below provides further examples in the Hindi language. The examples presented in Table 1 and 2 represent the pronunciations in terms of phones, the same principles apply to examples presented in other units of speech, such as dipones, or syllables.

TABLE 1

| | |
|---|---|
| CAPITALIZE | /K AE P AX T AX L AY Z/ |
| | /K AE P IX DX AX L AY Z/ |
| ALIENATED | /EY L IY AX N EY DX IX DD/ |
| | /EY L IY AX N EY T AX DD/ |
| | /EY L IY AX N EY DX IX DD/ |
| END TABLE 1 | |

TABLE 2

| | |
|---|---|
| phl | /PH AX L/ |
| | /F AX L/ |
| zindgi | /JH IH N DH AX G IY/ |
| | /Z IH N DH AX G IY/ |
| bazi | /B AA Z/ |
| | /B AA JH/ |
| END TABLE 2 | |

Maintaining all likely alternate pronunciations in a speech recognition system increases size of the vocabulary manifolds. Consequently, decreased recognition speed and lower accuracy of speech recognition can result.

Overview of Vocabulary Adaptation

The vocabulary used by a speech recognition system is adapted for particular speakers. This adaptation involves removing from the recognized vocabulary alternative pronunciations that are not used by a speaker. Those pronunciations that are used by the speaker are retained in the recognized vocabulary. Training can be performed to effect this adaptation, and may be performed during speaker enrollment, or an equivalent procedure.

Figure 1:
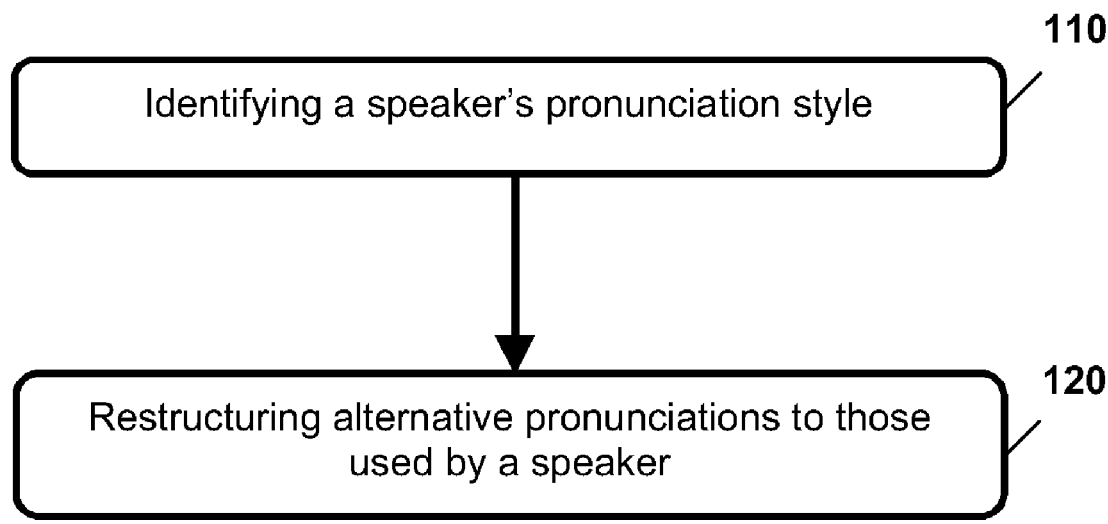
FIG. 1 is a flowchart representing steps involved in a technique described herein for improving speech recognition.

FIG. 1 flowcharts steps involved in improving a speech recognition system using the approach described above. At enrollment, the speaker can be prompted to read a predetermined text to adapt existing acoustic models to the speaker. During this process, the identity of the speaker's speech is "aligned" with the predetermined text by matching corresponding phonetic units in the spoken speech and predetermined text.

During this alignment process, if a sentence contains some words that have more than one possible pronunciation, then the speaker's speech is aligned to all applicable alternate pronunciations of these words. For such words, the pronunciation that is best aligned with the speech is retained, and alternate pronunciations are discarded from the recognized vocabulary for that speaker. The speech alignment procedure can, for example, score each speech-to-word pronunciation that is represented in the speech. The most likely pronunciation can be identified by a high score rating. This alignment can be performed using existing techniques such as Dynamic Time Warping, Viterbi algorithm, Hidden Markov Models or some other available procedure.

A vocabulary containing all alternate pronunciations is initially retained. This initial vocabulary can further be used to create more speaker-specific vocabularies. This is required as a single installation of a speech recognition system can have more than one "user profile". This technique can also be applied to progressively adapt the recognized vocabulary, as the speaker uses the speech recognition system.

Mechanics of Vocabulary Adaptation

The described vocabulary adaptation system operates by understanding a particular speaker's pronunciation style. For example, the words outlined in Table 3 below presents two alternate pronunciations of the sound corresponding to "ted" in their spellings.

TABLE 3

| | | |
|---|---|---|
| related, alerted, allocated, amelgameted, orchestrated | "ted" | DX IX DD or T IX DD |
| concentrate, concept, concert, concord, conduit, upon | "on" | AA N or AO N |
| aptitude, constitute, destitute, entity, identity, institute, quantities, rectitude | "tit" | T AX T or T IX T |

END TABLE 3

At speaker enrollment, the recognized vocabulary is adapted by putting some such words in the enrollment scripts. As the speaker speaks these words, an alignment scheme categorizes the speaker's style of pronunciation through certain "keywords". The pronunciation of these keywords is used to adapt the alternate pronunciation of all the words in the domain of keywords in the vocabulary. Accordingly, the whole vocabulary can be adapted to a speaker's style of speaking without the speaker speaking all the words in a vocabulary.

Procedure

Figure 2:
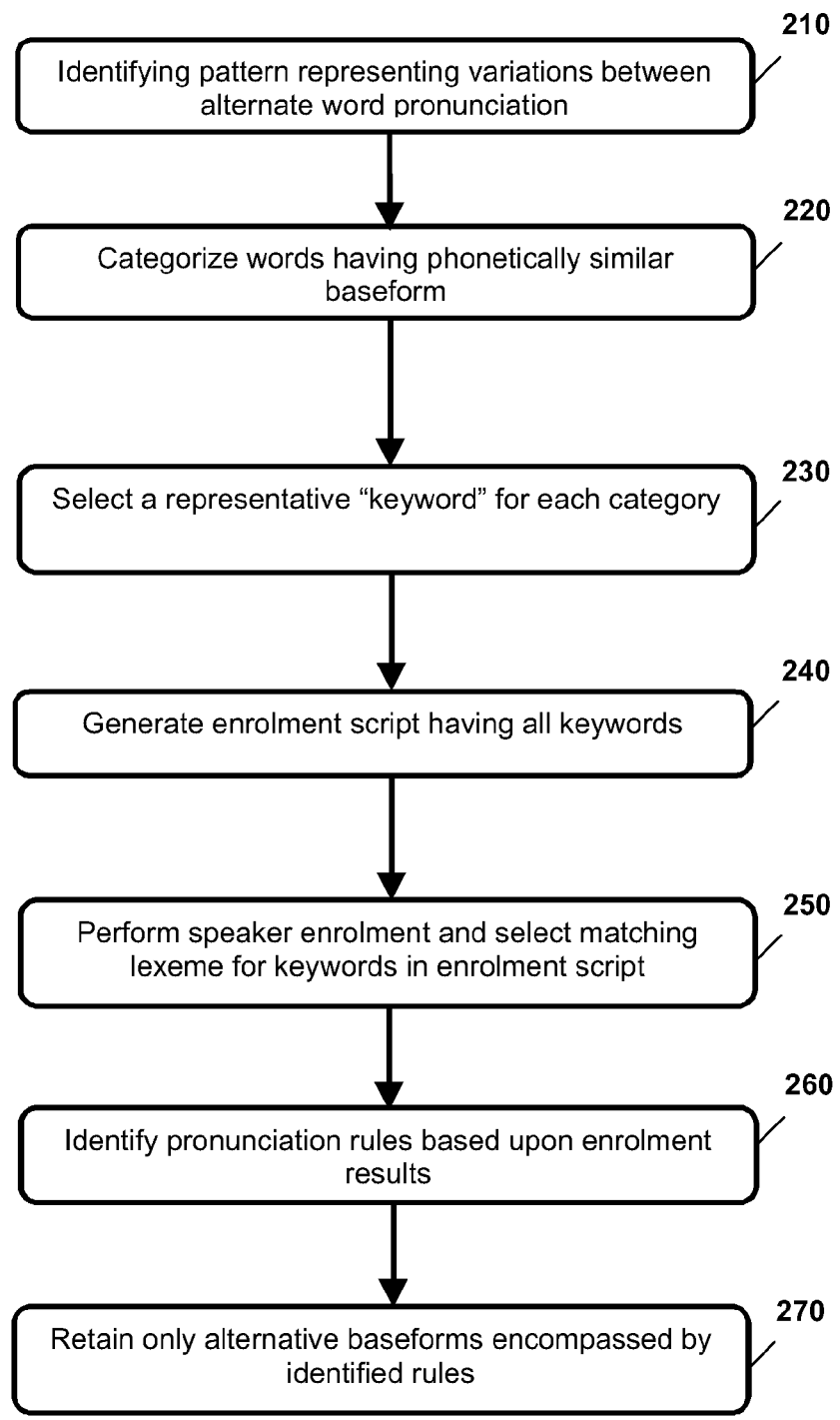
FIG. 2 is a flowchart representing steps involved in the technique of FIG. 1.

FIG. 2 flowcharts further steps involved in the described technique. Building a proposed adaptation system of the speaker vocabulary involves the following steps:

Step 210 Find prominent patterns that represent the variations between alternate pronunciations of each word. These patterns define the differences in the few phones that appear in the set of alternate baseforms for a particular word. For example, if the pronunciations for the word related are /R IH L EY DX IX DD/ and /R IH L EY T IX DD/, then the pattern that distinguishes one baseform from the other is DX⇔T, meaning that DX can be replaced with T (or vice versa) to form an alternate pronunciation for related. The objective is to extract all such relevant patterns from the speaker-independent vocabulary. These patterns serve as a distinguishing factor between a pair of baseforms for the same word.

Step 220 Words that have similar phonetic alternations in their alternate baseforms are bunched together. For example, words in each row of the first column of Table 3 above are grouped as one. Based on the speaker-specific pronunciation of one word, a generalization can be made of the speaker's style of pronunciation for all the words in the relevant category. So, if a speaker speaks "related" as R IH L EY DX IX DD, then that speaker's ambiguity for all words in that category is resolved upon this basis, and other pronunciations of these words can consequently also be removed from the vocabulary.

Step 230 Once such groups are formed, one word from each word is chosen to be the "keywords" for that category.

Step 240 An enrollment script is formed that has all these "keywords" in the script.

Step 250 Enrollment is performed and, as described earlier, the best lexeme (alternate pronunciation) for the "keywords" are selected by one of the schemes mentioned.

Step 260 Pronunciation rules for the speaker are learnt using the speaker-specific pronunciations of the keywords.

Step 270 For each word in a specific category, only those alternate baseforms of words are retained that follow the user-specific rules and other alternate pronunciations are discarded from the vocabulary.

Following the above steps for all the categories, the complete vocabulary is adapted to the user that has only those pronunciations that suits the speaker's style of speaking. All other pronunciations that are redundant to the user are deleted. This results in significant reduction in vocabulary size.

Figure 3:
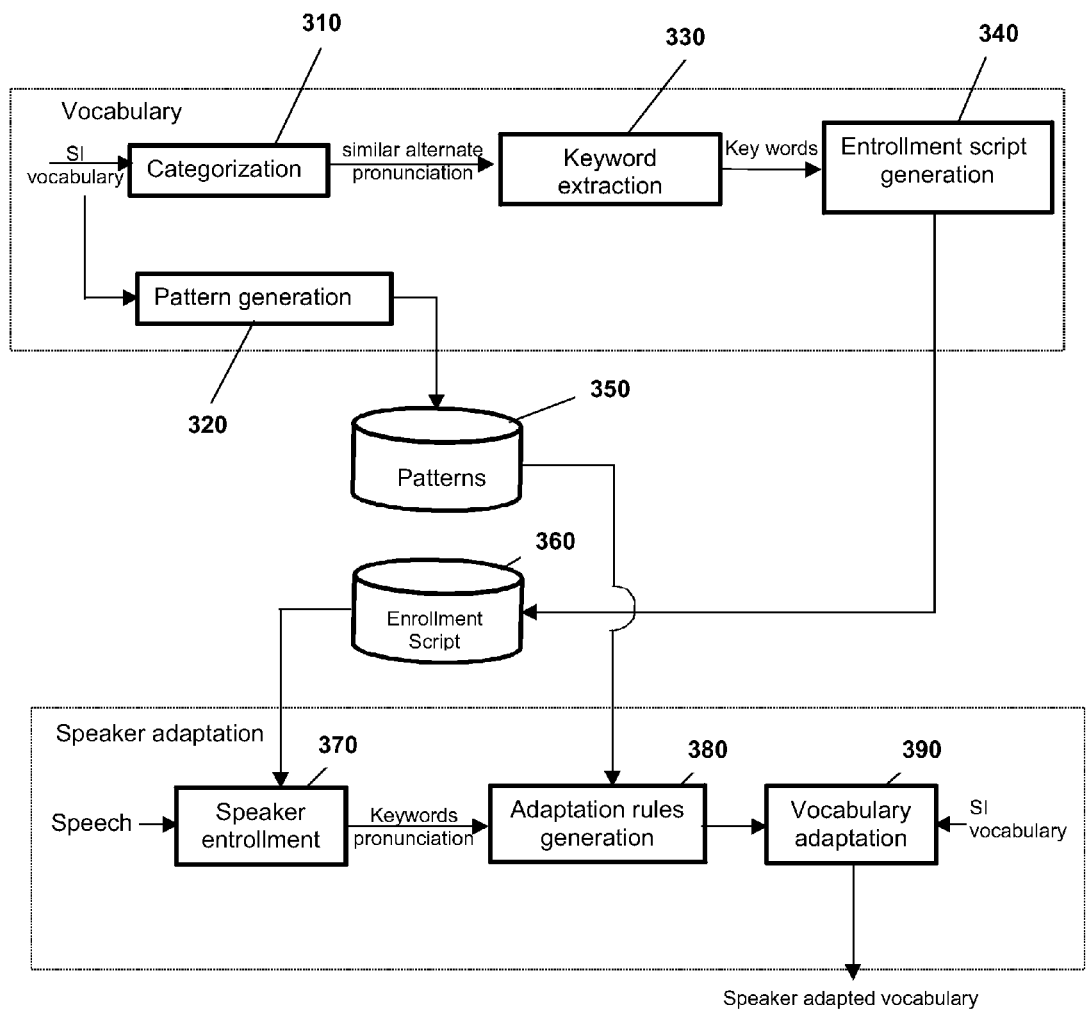
FIG. 3 is a block diagram representation of the technique.

FIG. 3 is a block diagram that shows a system for vocabulary adaptation. The described technique for generating a user-adaptive vocabulary that has pronunciations selected in accordance with a speaker's pronunciation style. The various operational blocks are described below.

Categorization—310

This process groups all the words that have similar alternations in their alternate baseforms. This is a one-time process for a vocabulary and has to be performed on the SI vocabulary. Only those alternations that occur sufficiently often considered in the SI vocabulary. This process generates categories, each of which has words that have similar alternations in their pronunciations for a particular sound. For example, the words "alienated", "regulated" and "educated" would all be in one category as all these words have two alternate pronunciations DX IX DD and T AX DD for the sound "ted" in all of them.

Pattern Generation—320

Using an algorithm similar to string matching with k-differences algorithm (referred to in T. Akutsu, "Approximate string matching with don't care characters," *Information Processing Letters* 55, 235-239, 1995) for every word in the speaker-independent (SI) vocabulary, all the alternate pronunciations are used to generate the pattern 350 that represents the variations from one baseform to another. If a word $w_i$ has N alternate baseforms $\{b_1, b_2, \ldots, b_N\}$, each of the $c_2^N$ possible pairs of alternate baseforms is considered to generate the patterns. This is a one-time process for a vocabulary and must be performed on the SI vocabulary.

Keyword Extraction—330

Once the words are grouped in categories, one or more keyword(s) are chosen for each category. These keywords are used in the enrollment script and are spoken by the speaker at the time of enrollment. The pronunciation of these keywords at the time of enrollment is used to generalize the assumed pronunciations of all the words in this category. For example, if, at the time of enrollment, a user speaks "regulated" as R EY G UH L EY T AX DD, then all the words in that category are assumed to be pronounced T AX DD for the sound "ted". Alternate pronunciations are thus deleted. Therefore, keywords are representative of a class, and are used to decide on the pronunciations of all the other words in that category. This is also a one time process in building a recognition system.

Enrollment Generation Script—340

Since vocabulary adaptation is performed with speaker enrollment, the enrollment scripts 360 are created such that the relevant keywords are part of the scripts. Thus, the scripts 360 that are used for enrollment should include these relevant keywords in the scripts—360. As with the above two categorization and keyword processes, this is also a one-time process. The above four processes complete the backend requirements of a vocabulary adaptation system.

Alignment Generation—370

During speaker enrollment, those pronunciations of all the keywords that get best scores at the time of adaptation are stored along with the keywords. This step is performed at the time of speaker enrollment and this gives us the speaker specific pronunciations (out of the list of speaker independent ones) of each keyword.

Adaptation Rules Generation—380

Once pronunciations of each keyword are decided by the speaker adaptation system, rules are formed based on these pronunciations. Continuing the above example, the rule for the category of words (regulated, educated and alienated) would be that this speaker's vocabulary would have the sound "ted" in these words pronounced as "T AX DD". The other pronunciation that contains /DX IX DD/ is thus deleted to form the speaker-adapted (SA) vocabulary.

Vocabulary Adaptation—390

Once all the rules are generated, the ambiguity in alternate pronunciations is removed by using these rules and a new speaker-specific vocabulary is generated. So the vocabulary now generated after speaker enrollment would have only one baseforms for the words (regulated, educated and alienated). This completes generation of speaker-specific vocabulary through one complete run of a vocabulary adaptation system.

A word can appear in multiple categories owing to the different sounds the word may have. For example, "reduced" is in one category owing to the multiple pronunciations of the sound "red" (R AX D or R IX D) and in another category owing to the sound "uced" (UW S TD or Y UW S TD). There can be more than one keyword for each category that can be put in the enrollment scripts. This provides greater confidence about the speaker's pronunciation of speaking that sound in a particular manner. Based on the speaker frequency of using the different alternate pronunciations, rules can be generated that take this into account and generate a SA vocabulary. For example, if there are N keywords representing the sound "ted" and the user pronounces some keywords with the sound /T IX DD/ and some with /DX IX DD/, having both the alternate pronunciations in the SA vocabulary for words in that category may be desirable.

Computer Hardware and Software

Figure 4:
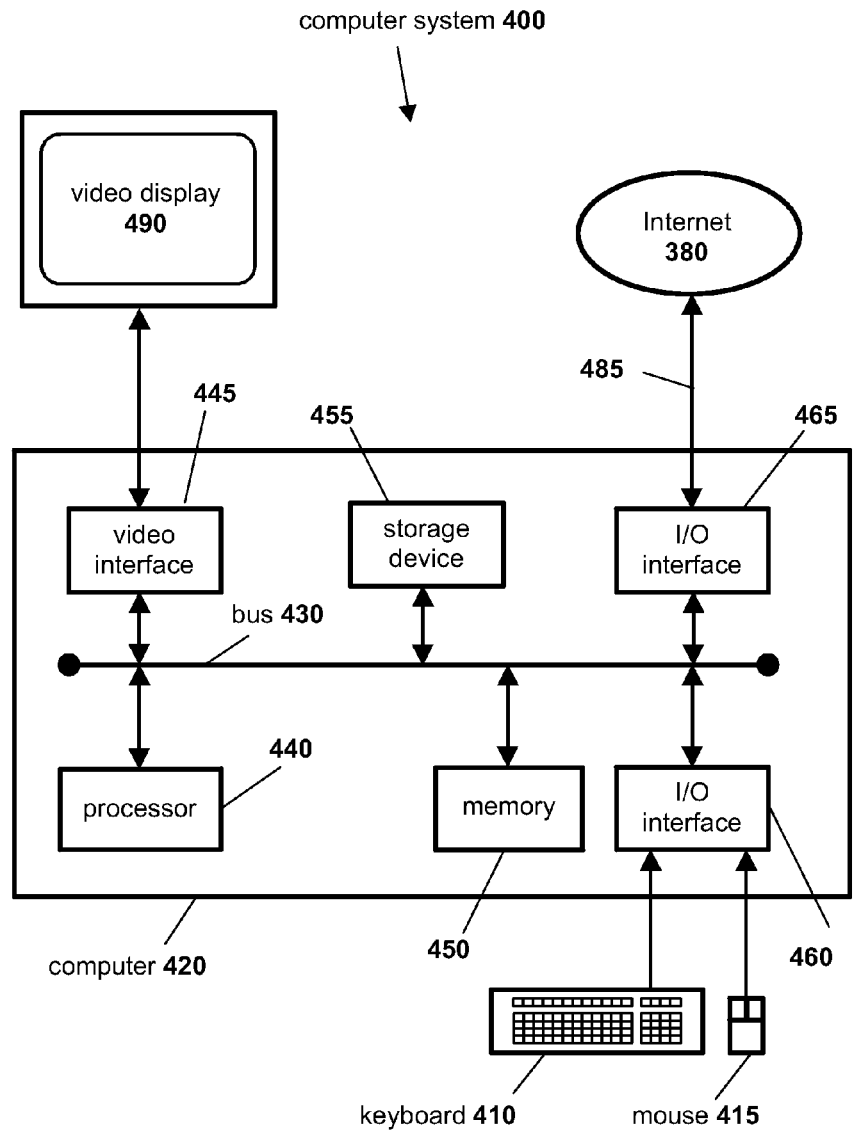
FIG. 4 is a schematic representation of a computer system suitable for performing the techniques described with reference to FIGS. 1, 2 and 3.

FIG. 4 is a schematic representation of a computer system 400 that can be used to implement the techniques described herein. Computer software executes under a suitable operating system installed on the computer system 400 to assist in performing the described techniques. This computer software is programmed using any suitable computer programming language, and may be considered as comprising various software code means for achieving particular steps.

The components of the computer system 400 include a computer 420, a keyboard 410 and mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software operating under the operating system. The memory 450 typically includes random access memory (RAM) and read-only memory (ROM), and is used under direction of the processor 440.

The video interface 445 is connected to video display 490 and provides video signals for display on the video display 490 for the benefit of the user. User input to operate the computer 420 is provided from the keyboard 410 and mouse 415. The storage device 455 can include a disk drive or any other suitable storage medium.

Each of the components of the computer 420 is connected to an internal bus 430 that includes data, address, and control buses, to allow components of the computer 420 to communicate with each other via the bus 430.

The computer system 400 can be connected to one or more other similar computers via an input/output (I/O) interface 465 using a communication channel 485 to a network, represented in this case as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

Other configurations or types of computer systems can be equally well used to implement the techniques herein, as is understood by those skilled in the relevant art. The computer system 400 is described only as an example of a particular type of system suitable for implementing the described techniques.

CONCLUSION

A method, a computer system and computer software are described herein in the context of improved speech recognition. Various alterations and modifications can be made to the techniques and arrangements described herein, as would be apparent to one skilled in the relevant art.

We claim:

1. A computer system for speaker adaptation of vocabulary for a speech recognition system, the computer system comprising:

at least one processor adapted to:

identify a pronunciation style of at least one phoneme for a speaker from a plurality of pronunciation styles for the at least one phoneme, the identification of the pronunciation style being based upon a reading of an enrollment script by the speaker, the enrollment script including at least one keyword, wherein the at least one keyword contains the at least one phoneme and is representative of a category of words having the at least one phoneme;

determine at least one pronunciation style for each of the words in the category consistent with the identified pronunciation style; and restrict a vocabulary used in the speech recognition system to pronunciations consistent with the identified pronunciation style.

2. The computer system of as claimed in claim 1, further comprising a component operable for recording an enrollment audio corresponding to a reading of the enrollment script by the speaker, the enrollment audio including predetermined keywords including the at least one keyword.

3. The computer system as claimed in claim 2, wherein the predetermined keywords are representative of words having a phonetically similar baseform.

4. The computer system as claimed in claim 1, wherein the at least one processor is further adapted to align phonetic units from the enrollment audio to corresponding phonetic units of the enrollment script.

5. The computer system as claimed in claim 1, wherein the at least one processor is further adapted to:

retain, in a recognized vocabulary for the speaker, one of plural alternative pronunciations, the one of plural alternative pronunciations being selected based upon a best match with a phonetic unit from the reading of the enrollment script; and exclude, from the recognized vocabulary for the speaker, remaining alternative pronunciations of the plural alternative pronunciations.

6. The computer system as claimed in claim 1, wherein the at least one processor is further adapted to identify pronunciation styles of plural phonemes for the speaker, the identification of the pronunciation styles being based upon the reading of the enrollment script.

7. A computer-readable storage device storing instructions that when executed by at least one processor cause the at least one processor to execute acts of:

identifying a pronunciation style of at least one phoneme for a speaker from a plurality of pronunciation styles for the at least one phoneme, the identification of the pronunciation style being based upon a reading of an enrollment script by the speaker, the enrollment script including at least one keyword, wherein the at least one keyword contains the at least one phoneme and is representative of a category of words having the at least one phoneme;

determining at least one pronunciation style for each of the words in the category consistent with the identified pronunciation style; and restricting a vocabulary used in the speech recognition system to pronunciations consistent with the identified pronunciation style.

8. The computer-readable storage device of claim 7, further comprising instructions that when executed by the at least one processor cause the at least one processor to record an enrollment audio corresponding to a reading of the enrollment script by the speaker, the enrollment audio including predetermined keywords including the at least one keyword.

9. The computer-readable storage device of claim 8, wherein the keywords are representative of words having a phonetically similar baseform.

10. The computer-readable storage device of claim 8 further comprising instructions that when executed by the at least one processor cause the at least one processor to align phonetic units from the enrollment audio to corresponding phonetic units of the enrollment script.

11. The computer-readable storage device of claim 8 further comprising instructions that when executed by the at least one processor cause the at least one processor to perform acts of:

retaining in a recognized vocabulary for the speaker one of plural alternative pronunciations, the one of plural alternative pronunciations being selected based upon a best match with a phonetic unit from the reading of the enrollment script; and excluding from the recognized vocabulary for the speaker remaining alternative pronunciations of the plural alternative pronunciations.

12. A method for adapting a speaker vocabulary in a speech recognition system, the method comprising:

identifying a pronunciation style of at least one phoneme for a speaker from a plurality of pronunciation styles for the at least one phoneme, the identification of the pronunciation style being based upon a reading of an enrollment script by the speaker, the enrollment script including at least one keyword, wherein the at least one keyword contains the at least one phoneme and is representative of a category of words having the at least one phoneme;

determining at least one pronunciation style for each of the words in the category consistent with the identified pronunciation style; and restricting a vocabulary used in the speech recognition system to pronunciations consistent with the identified pronunciation style.

13. The method of claim 12, further comprising recording an enrollment audio corresponding to a reading of the enrollment script by the speaker, the enrollment audio including predetermined keywords having a phonetically similar baseform.

14. The method of claim 13, further comprising further comprising aligning phonetic units from the enrollment audio to corresponding phonetic units of the enrollment script.

15. The method of claim 13, further comprising acts of:

retaining in a recognized vocabulary for the speaker one of plural alternative pronunciations, the one of plural alternative pronunciations being selected based upon a best match with a phonetic unit from the reading of the enrollment script; and excluding from the recognized vocabulary for the speaker remaining alternative pronunciations of the plural alternative pronunciations.

* * * * *